(No Model.) 2 Sheets—Sheet 1.
A. M. SHURTLEFF.
ATOMIZER.
No. 397,315. Patented Feb. 5, 1889.
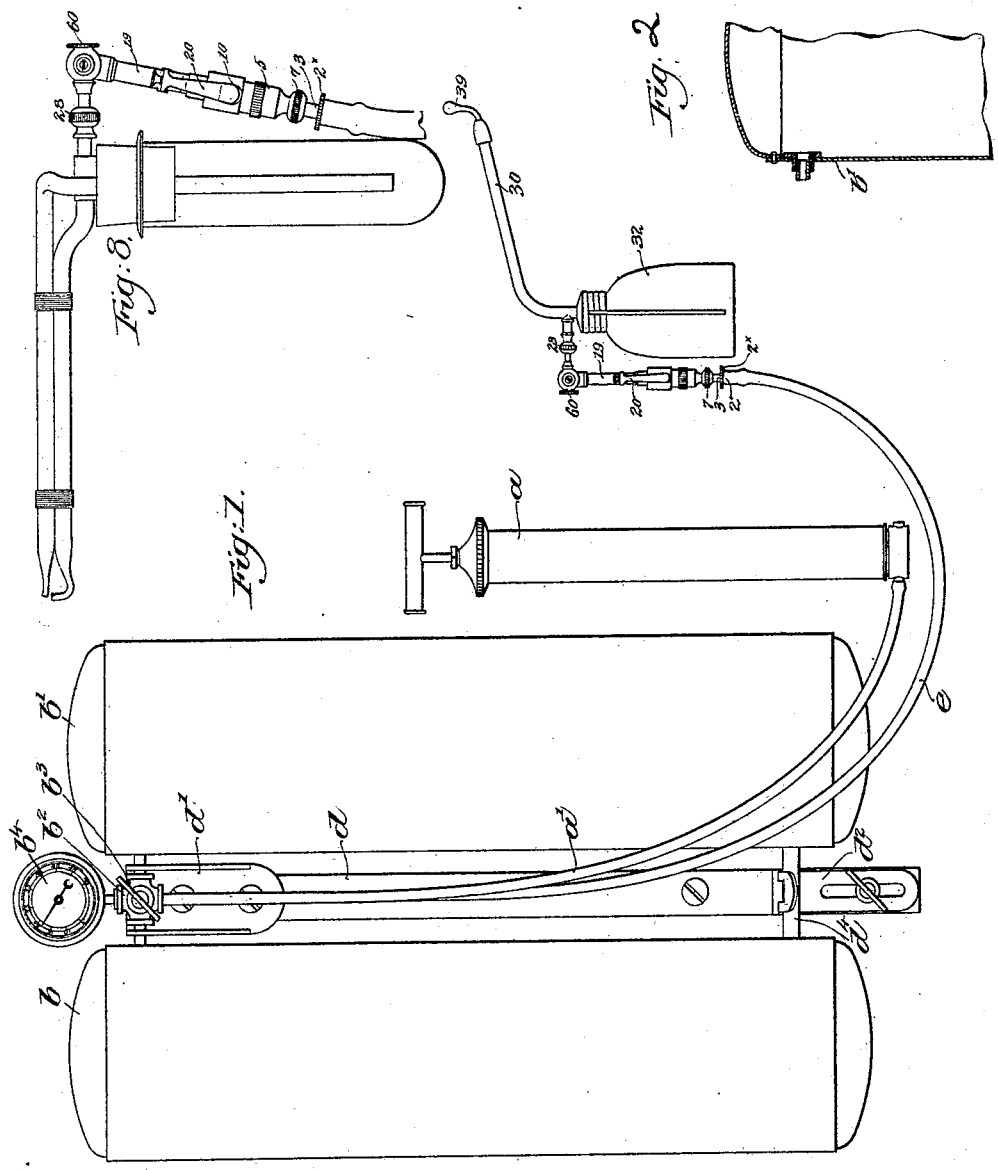
Witnesses.
Frederick L. Emery.
Fred L. Greenleaf.
Inventor.
Asahel M. Shurtleff
By Crosby & Gregory
Attys.

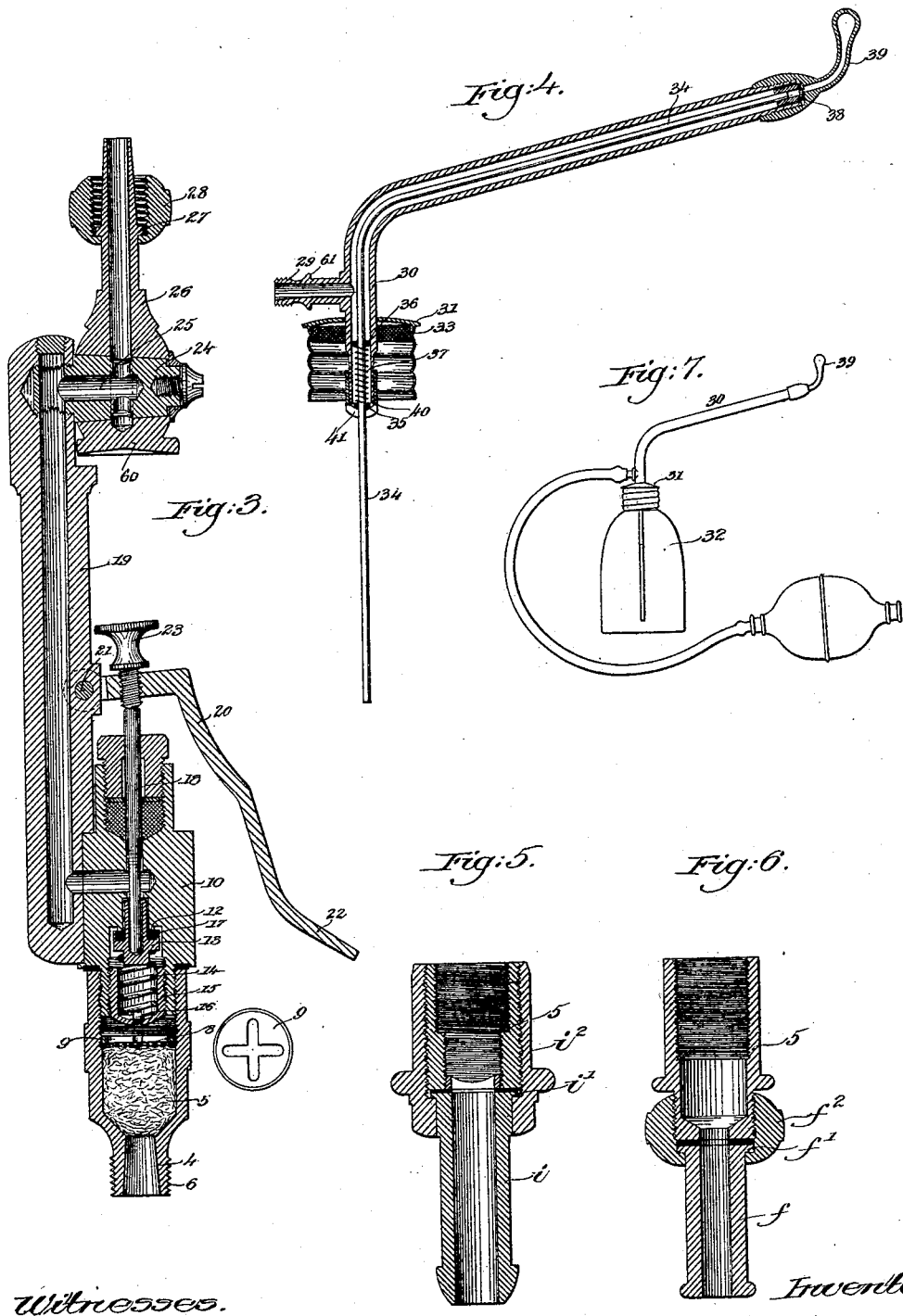

UNITED STATES PATENT OFFICE.

ASAHEL M. SHURTLEFF, OF BOSTON, MASSACHUSETTS, ASSIGNOR TO CODMAN & SHURTLEFF, OF SAME PLACE.

ATOMIZER.

SPECIFICATION forming part of Letters Patent No. 397,315, dated February 5, 1889.

Application filed June 2, 1888. Serial No. 275,817. (No model.)

*To all whom it may concern:*

Be it known that I, ASAHEL M. SHURTLEFF, of Boston, county of Suffolk, State of Massachusetts, have invented an Improvement in Atomizers, of which the following description, in connection with the accompanying drawings, is a specification, like letters on the drawings representing like parts.

This invention has for its object to construct an atomizer; and it consists in various details of construction, to be hereinafter described and claimed.

The atomizer herein shown is of the class employing compressed air for atomization, yet some of the details to be referred to are applicable to atomizers of other well-known classes.

Figure 1 shows an atomizer embodying this invention. Fig. 2 is a detail to be referred to; Fig. 3, a vertical section of the air-controlling valve or cut-off, the air-filter, and the pivoted connector by which the cut-off is connected with the outlet-tube; Fig. 4, a horizontal section of the outlet or delivery tube of the atomizer; Figs. 5 and 6, vertical sections of modified forms of air-filters and couplings adapted to be connected with the air-tube. Fig. 7 shows in elevation an atomizer supplied with the usual air-bulb and with atomizing-nozzles embodying this invention; Fig. 8, a side view of the air-controlling or cut-off valve, shown in connection with an atomizer of a different class.

The air-pump $a$ (see Fig. 1) is of any suitable construction, having leading from it a pipe, $a'$, which pipe leads to and is connected with the air-cylinders $b$ $b'$ by branch pipes or screw-threaded nipples radiating from a shell, case, or frame, $b^2$, which is provided with a four-way cock, $b^3$. The pipes or nipples radiating from the shell in opposite directions have right and left screw-threads which enter collars fastened to the cylinders, as best shown in Fig. 2. A gage, $b^4$, is connected with one of the radiating pipes or nipples, as shown, to determine the pressure of the air contained in the cylinders.

The air-pipe $e$ leads from the four-way cock $b^3$, its outer or free end being firmly wired or attached to a coupling or connection, 2. The coupling 2 has a tapering nozzle or end portion, 3, which fits the tapering opening 4, formed in the lower end of the air-filter 5. The coupling 2 has formed on it a flange, $2^×$, and the tapering end portion, 3, has formed on it a hub or flange.

A nut, 7, recessed to receive the hub or flange on the end portion, 3, is fitted loosely on said end portion, its removal therefrom being prevented by said hub. The nut 7 is interiorly screw-threaded, and is thereby adapted to be screwed upon the threaded portion 6 of of the air-filter 5, connecting the air-tube $e$ with the said air-filter. The nut 7 serves as a union to draw the tapering end portion into the opening 4 to make an air-tight connection, and yet permit the tube $e$ to be turned or twisted as much as desired. Instead of this particular form of coupling, a coupling such as shown in Fig. 6 may be employed, it comprising the coupling $f$, having the flange $f'$, the nut $f^2$, recessed to receive the flange $f'$ and interiorly screw-threaded to be screwed upon the air-filter 5. In lieu of this form the coupling shown in Fig. 5 may be employed, it comprising the coupling $i$, having the flange $i'$, the nut $i^2$, recessed to receive the flange $i'$ and interiorly screw-threaded to be screwed upon the air-filter 5. The air-filter 5 contains cotton or other suitable material, held in place by a slitted or foraminous plate, 9.

The air-controlling valve or cut-off comprises the valve-case 10, having a hole or passage through it, a valve-seat, 12, and a valve, 13. The valve 13 is supported by and held pressed against its seat by a spiral spring, 14, seated in a cap, 15, having a hole or passage through it. It is held to its seat by pressure of compressed air against it also. The valve 13 has an annular groove, which is filled with any suitable packing, 17. The valve-stem 18 passes vertically through the case 10, it being connected at its lower end with the valve 13 loosely or otherwise, as desired, said stem having its bearings in a suitable stuffing-box at the upper end of the valve-case 10. The valve-case 10 is attached rigidly or otherwise to one side of the tube or hollow cylinder 19, the passage through the valve-case 10 communicating with the opening through the said tube or cylinder. A bent lever, 20, is pivoted to the tube or cylinder 19 at 21, the outer or free end of the said lever 20 being bent downward and outward, as at 22, to be engaged by the thumb or fingers of the operator, the said outward bend 22 being adapted to receive upon or beneath it the finger or fingers or thumb of the operator, to thereby hold the lever in one or its other extreme position, preventing accidental depression of the lever, except when desired.

The adjusting-screw 23 passes through the upper end of the bent lever 20, the end of which screw bears down upon the upper end of the valve-stem 18. It will be seen that by depressing the bent lever 20 the valve-stem 18 will be depressed by the adjusting-screw 23 and open the valve, and, furthermore, that the extent of movement of the valve-stem may be determined by the said adjusting-screw, thereby compensating for different length stems, &c.

The valve-case 10 may be attached to either side of the cylinder 19, so that the lever 20 may be operated with either the right or left hand conveniently; but as all rubber tubing sufficiently heavy to resist pressure of compressed air is inflexible to the extent that when secured to any metallic connection having no provision for adjustment circumferentially it resists such movement or adjustment.

I have herein shown a coupling made as described to allow freedom of movement of the valve-case on it, so that the said valve-case and cylinder may together be turned in whatever position desired to be operated by one or the other hand. For these and other reasons to be referred to, the coupling 2, made as described, is essential. The tube or cylinder 19 at its upper end has projecting from it laterally a slightly-tapering hub or cylinder, 24, having a passage, 25, through it, which communicates with the passage through the tube or cylinder 19, said passage 25 terminating at one side of the cylinder or projection 24. A tapering nozzle or coupling, 26, is placed upon the hub or projection 24, it being held by a screw and nut with sufficient friction to maintain its position wherever placed, and also to form an air-tight joint.

The nozzle or coupling 26 has a flange, 27, and a nut, 28, recessed to receive the flange. The nozzle or coupling 26 has at its rear end a thumb-bearing, 60, against which the thumb may rest, such position for the thumb being most convenient.

It will be seen that the nozzle or coupling 26, turning on the hub 24, is free to be moved to point in any direction desired.

The tapering nozzle or coupling 26 is adapted to enter the tube or pipe 29, connected with or formed as a part of the air-tube 30, and the nut 28 is interiorly screw-threaded to be turned upon the screw-threaded end of the said tube 29, to thereby draw the tapering portion of the nozzle 26 into said tube or pipe.

The tube or nipple 29 has a tapering internal bore, and has also a conical flange, 61, upon or over which the usual rubber air-tube may be sprung or drawn when it is not desired to use the tube $e$ and coupling.

The nozzle 26, its flange 27, and nut 28 are substantially the same as the nozzle 3, its flange, and nut 7, before described, it turning frictionally on its hub to occupy any position desired.

The air-tube 30, herein shown as bent at an angle, is attached to the cap or stopper 31 of the jar or vessel 32, said cap or stopper containing a suitable packing, 33.

The air-tube 30 contains the liquid-tube 34, which extends downward at or nearly to the bottom of the jar or vessel 32. A cap, 40, having an opening, 41, is threaded upon the said tube 30, having seated within it the washer 35, and the liquid-tube 34 has formed upon or attached to it a flange, 36, within said tube 30, and a spiral spring, 37, encircles the liquid-tube 34, one end of which bears against the flange 36 and the other end against the washer 35, seated in the cap 40. The liquid-tube 34 at its forward end is provided with the usual atomizing-nozzle, 38, and the air-tube 30 is provided with the usual spray-nozzle, 39, and as spray-nozzles of different shape and configuration are desirable said nozzles are detachable.

The atomizing-tubes (see Fig. 4) are of the kind in which the two tubes are arranged concentrically, as described, and in which the air and liquid come together between the end of the inner nozzle, 38, and the inner surface of the outer nozzle, 39. In this kind of atomizer its practical and successful operation depends largely upon proper adjustment of their nozzles to each other.

This kind of atomizer as usually made does not have its nozzle adjustable, the position of inner tube being in some cases dependent upon its friction against the outer one only, and in other cases being soldered to the outer one at the inner end of the latter. In such atomizers it is difficult or impossible to make successful use of a nozzle rotatable by means of a screw-thread and designed to discharge spray in any of the directions to which it may be turned. With my improved construction, however, it is necessary only to screw the nozzle on until the surfaces, as described, are in contact, and proper adjustment is at once secured and maintained through all remaining revolutions of the outer nozzle. By securing the liquid-tube 34 in the manner shown it may be removed at any time desired and cleansed or a new tube inserted.

The operator using the atomizer holds the controlling-valve or cut-off in one hand and depresses the lever 20, and by connecting said valve with the air-tube $e$ by the coupling herein shown and described it may be turned to present the lever 20 at either side, to be operated by either the thumb or fingers or by either the right or left hand; also, by providing the coupling or connection 26 between the said controlling-valve and the atomizing-tubes with the friction-joint herein shown it will be seen that the said coupling may be turned or pointed in either direction and still subserve the purpose designed for it. It will also be seen that the lever 20 may be adjusted to move the valve-stem more or less, as desired, to thereby control the supply of air or to compensate for valve-stems of different length.

In Fig. 8 is illustrated the air-controlling valve and a bottle, and it will be seen that the said valve may be held closely against the bottle irrespective of the relative angles of the coupling 26 and valve; also, when a bottle of the form shown in Fig. 7 is used and is placed on a table the coupling 26, turning on its hub, permits the valve to swing outward, that the bottle may not be overturned.

It will be seen that many of the features herein described are as applicable to atomizers of other classes as to those herein shown.

I claim—

1. In an atomizer, the air-controlling valve or cut-off comprising the valve-case and spring-controlled valve and valve-stem, and the bent lever, as 20, for moving said valve-stem, substantially as described.

2. In an atomizer, the air-controlling valve or cut-off comprising the valve-case, valve, and valve-stem, combined with the operating-lever and the adjusting-screw 23, which engages the valve-stem when the lever is moved, substantially as described.

3. In an atomizer, the air-controlling valve comprising the valve-case, valve, and valve-stem, combined with the coupling connecting the tube e with the air-controlling valve and upon which the said air-controlling valve is free to be turned, substantially as described.

4. In an atomizer, the air-controlling valve comprising the valve-case 10 and air-filter connected with it at its lower end, the valve, and the operating-lever therefor, combined with the coupling 2, upon which the said air-controlling valve is free to be revolved, substantially as described.

5. In an atomizer, the air-controlling valve connected with the air-pipe e by a coupling upon which the said air-controlling valve is free to revolve, combined with the frictionally-jointed coupling or nozzle comprising a tapering nozzle, 26, flange 27, and an interiorly-screw-threaded nut connecting said air-controlling valve with the atomizing-tube, substantially as described.

6. In an atomizer, the air-controlling valve comprising the valve-case and valve, combined with the air-filter rigidly connected to the valve-case, and the air-tube leading to the filter, substantially as described.

7. In an atomizer, the air-tube 30, combined with the liquid-tube 34, placed in said air-tube 30, and the spring 37, supporting said liquid-tube, and the longitudinally-movable nozzle, substantially as described.

8. In an atomizer, the air-controlling valve having the operating-lever 20, and tube or cylinder 19, to which the said valve is connected, combined with a coupling or nozzle connected with the opposite end of the tube or cylinder 19 by and rotatable upon a hub, 24, extended at right angles to the said cylinder, substantially as described.

9. In an atomizer, the air-controlling valve having the operating-lever 20, and the tube or cylinder 19, combined with the jointed or reversible coupling or nozzle 26, attached to one end thereof, substantially as described.

10. In an atomizer, the tube or cylinder, as 19, combined with the coupling or nozzle 26, and with a thumb-rest, 60, at its rear end, substantially as described.

In testimony whereof I have signed my name to this specification in the presence of two subscribing witnesses.

ASAHEL M. SHURTLEFF.

Witnesses:
 F. L. EMERY,
 J. C. SEARS.